United States Patent [19]

Adams et al.

[11] Patent Number: 4,749,220
[45] Date of Patent: Jun. 7, 1988

[54] WIND DEFLECTOR MOUNTING APPARATUS

[75] Inventors: Wendell P. Adams; Walter E. Eifrid; Norbert E. Romie, all of Fort Wayne, Ind.

[73] Assignee: Navistar International Transportation Corp., Chicago, Ill.

[21] Appl. No.: 40,919

[22] Filed: Apr. 21, 1987

[51] Int. Cl.⁴ ............................................. B62D 35/00
[52] U.S. Cl. ..................................................... 296/1 S
[58] Field of Search ................................... 296/1 S, 91

[56] References Cited

U.S. PATENT DOCUMENTS

| | | | |
|---|---|---|---|
| 3,929,369 | 12/1975 | Blair | 296/1 S |
| 4,079,984 | 3/1978 | Powell | 296/1 S |
| 4,084,846 | 4/1978 | Wiley, Jr. et al. | 296/1 S |
| 4,102,548 | 7/1978 | Kangas | 296/1 S |
| 4,462,628 | 7/1984 | Gregg | 296/1 S |
| 4,607,874 | 8/1986 | Peairs | 296/1 S |

OTHER PUBLICATIONS

"International S-Series 2375" Brochure No. AD 40877M, 1983, pp. 1, 4, 8.

Primary Examiner—Robert R. Song
Attorney, Agent, or Firm—F. David Aubuchon; Dennis K. Sullivan

[57] ABSTRACT

An apparatus for mounting an aerodynamic device, preferably the top center portion of a three-piece wind deflector, to the roof of a truck cab wherein the mounting apparatus includes a base member attached to the cab roof, a forward link pivotally connected to both the device and the forward portion of the base member and a rearward link, preferably of selectively variable length, pivotally connected to the rearward portion of the device and to the base member. The forward and rearward links form, with the base member and device, a four-bar linkage, disposed to shift the forward edge of the device still more forwardly relative to the cab roof as it moves from a raised position to a lower position and thus maintains the rearward edge of the device more nearly over the cab roof in the lowered position. A locking plate is preferably provided to secure the forward link to the base member in either the lowered or raised position and may be slotted to control the movement of the forward link.

11 Claims, 3 Drawing Sheets

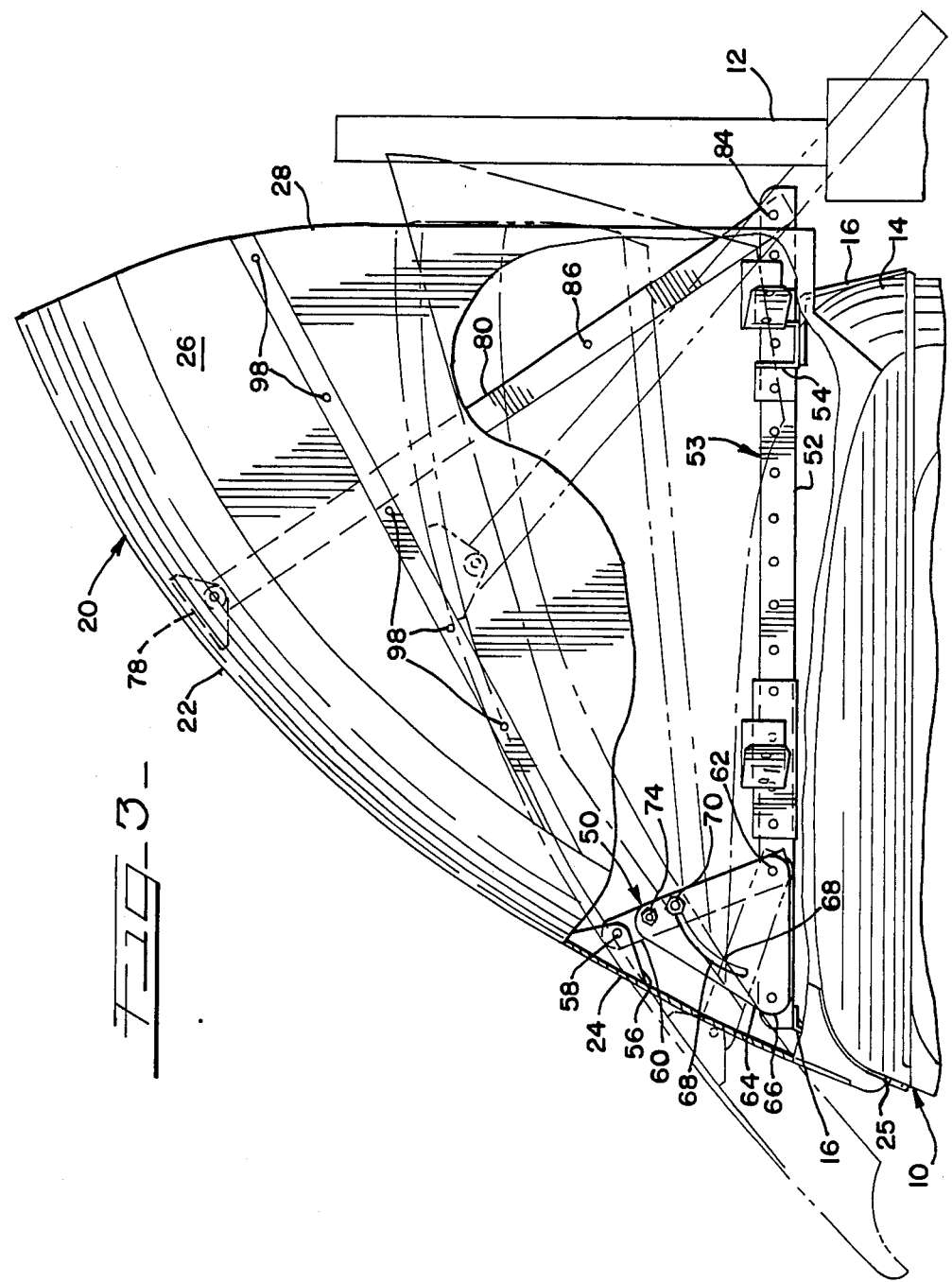

WIND DEFLECTOR MOUNTING APPARATUS

BACKGROUND OF THE INVENTION

This invention relates to aerodynamic structures of the type disposed on the cab roof of highway truck tractors for reducing the aerodynamic drag of the tractor-trailer vehicle, and, more particularly, to apparatus for mounting the structure to the cab roof which permits the structure to be disposed in its raised operating position or in a lowered position for transport of the truck tractor from the factory to the dealer or customer.

THE PRIOR ART

It is known to provide an aerodynamic structure for a truck cab which may be adjusted to various positions of operation for the purpose of aerodynamically accommodating trailers of different heights, as shown in U.S. Pat. Nos. 4,102,548 and 4,462,628, or to a nonoperating position, as in U.S. Pat. No. 4,607,874.

It is further known to provide a collapsible three-piece wind deflector wherein the side portions fold inwardly and the top portion is lowered over the folded side pieces to make a compact structure. This type of structure, which has been sold for several years by the assignee hereof and its predecessors as the International S-Series 2375, uses the lowered or collapsed position of the wind deflector for movements within the factory. Perhaps more importantly, truck tractors are frequently shipped from the factory to a customer or dealer in groups of two or more where the front end of one truck is stacked on the rear framework of another truck. In this position, a complete aerodynamic device on the rear truck would likely exceed the legal height limit for highway use and thus encounter obstacles such as bridges and tree limbs. Consequently, it is beneficial to provide a lowered or collapsed position for the aerodynamic structure of the highway trucks.

Each of the devices mentioned above can be characterized by the fact that it is pivotally mounted to a framework fixed to the roof of the tractor cab near the forward portion thereof and swings upwardly or downwardly relative to that fixed pivot point. In the event that the wind deflector has a long top wall and the tractor has exhaust pipes extending upwardly located just behind the tractor cab, this fixed pivot point will result in interference problems.

SUMMARY OF THE INVENTION

Accordingly, it is an object of the invention described and claimed herein to provide an apparatus for mounting an aerodynamic device to the roof of the truck cab which will provide for raising and lowering the device between a raised operating position and a lowered transport position while providing for the device to shift forwardly when moved to the lowered position.

The foregoing object and others which will become apparent hereafter are specifically met in an apparatus for mounting an aerodynamic device, preferably the top center portion of a three-piece wind deflector, to the roof of a truck cab wherein the mounting apparatus includes a base member attached to the cab roof, a forward link pivotally connected to both the device and the forward portion of the base member and a rearward link, preferably of selectively variable length, pivotally connected to the rearward portion of the device and to the base member. The forward and rearward links form, with the base member and device, a four-bar linkage, disposed to shift the forward edge of the device still more forwardly relative to the cab roof as it moves from a raised position to a lower position and thus maintains the rearward edge of the device more nearly over the cab roof in the lowered position. A locking plate is preferably provided to secure the forward link to the base member in either the lowered or raised position and may be slotted to control the movement of the forward link.

DETAILED DESCRIPTION OF THE DRAWINGS

Other objects and advantages of the invention will become more apparent upon reading the detailed description thereof and upon reference to the drawings in which:

FIG. 3 is a side view of the aerodynamic device and truck cab of FIG. 1 in the operating position with the lowered position being shown in phantom lines, the drawing being partially broken away to illustrate the mounting apparatus within the aerodynamic device.

DETAILED DESCRIPTION OF THE INVENTION

In the ensuing description, it will be appreciated that the terms "left", "right", "forward", and "rearward", are to be taken, in accordance with the art, relative to the position of one facing in the usual direction of travel of the vehicle.

Figure 1:
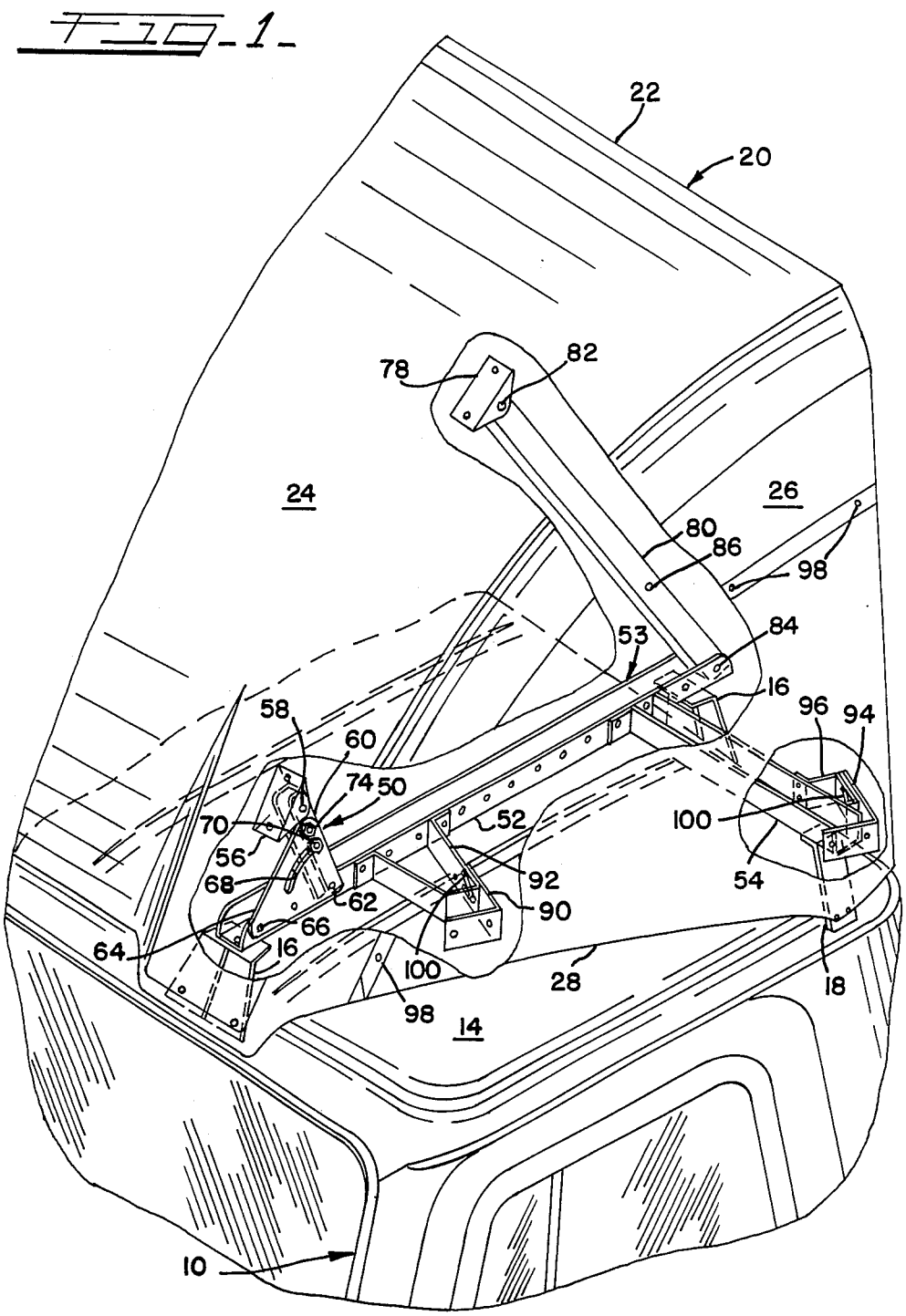
FIG. 1 is a three-quarter downward looking perspective view, partially broken away, of the left hand portion of an aerodynamic device mounted on the left portion of a roof of a tractor cab, the aerodynamic device being shown in the raised or operating position.
Figure 2:
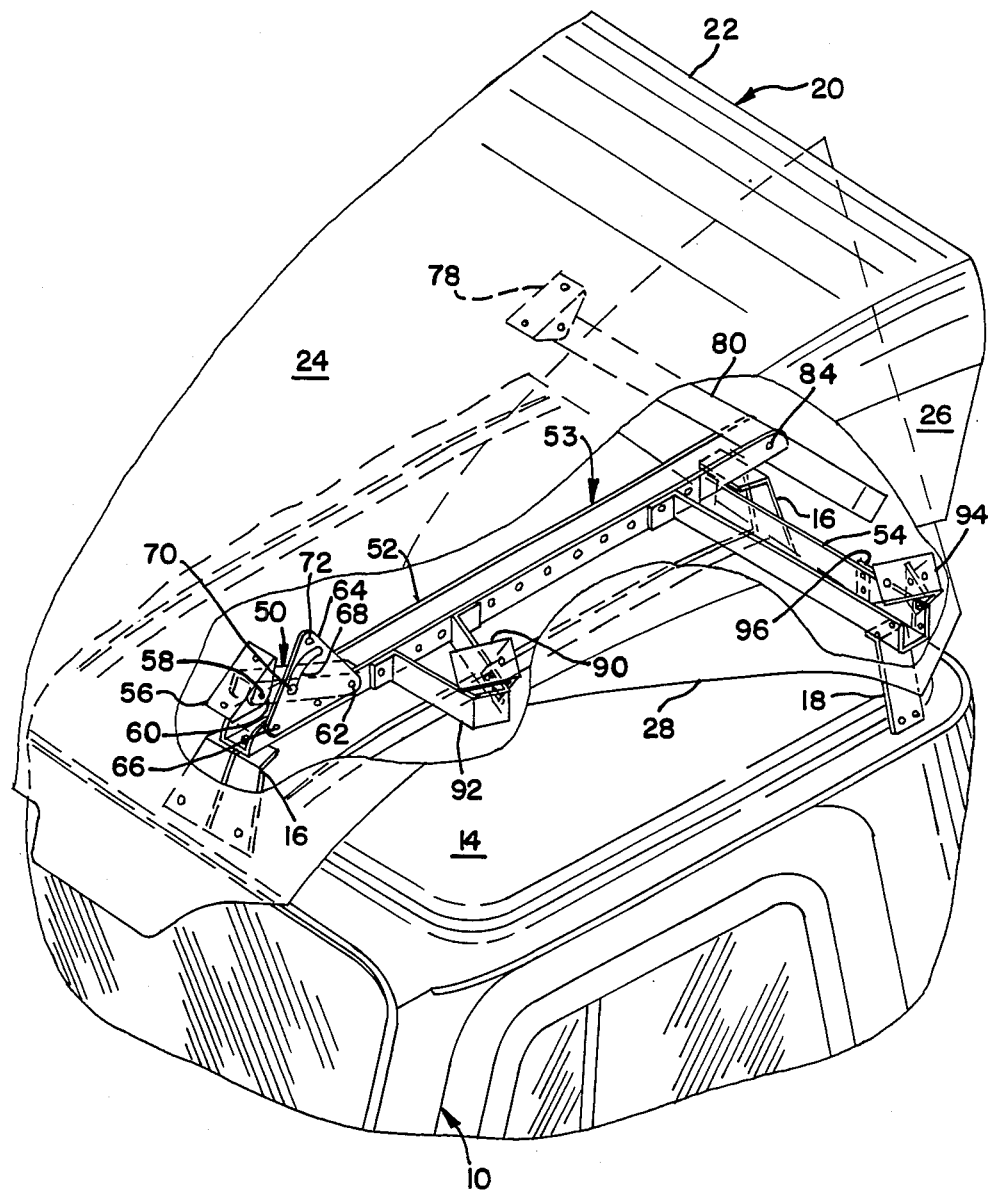
FIG. 2 is a three-quarter perspective view similar to FIG. 1 but showing the aerodynamic device in its lowered position.

Referring now to FIGS. 1 and 2, there is shown the left upper portion of a cab 10 of a highway tractor on which the left portion of an aerodynamic or wind deflector 20 is mounted by a four-bar linkage 50. It will be appreciated that both the cab and aerodynamic device are symmetrical about the fore-and-aft centerline of the tractor and that a second linkage 50 supports and controls the right portion (not shown) of the aerodynamic device 20.

Located immediately behind the cab 10 adjacent either the left or right rear corner (or both) is an exhaust stack 12 including a muffler which is attached to the truck engine (not shown) and generally supported by the cab 10 through brackets (not shown).

The roof 14 of cab 10 is further provided with brackets 16 at the front and rear which support in fixed position a fore-and-aft extending U-shaped channel base member 52 of a base member assembly 53 which includes side stabilizer 54 supported from the cab roof by bracket 18.

The wind deflector or aerodynamic device 20 is a three dimensional generally wedge-shaped structure designed to deflect the air stream encountered in forward movement of the tractor upwardly and laterally outwardly onto the top and sides of the trailer (not shown) for streamlining purposes. The aerodynamic device 20 is a three-piece assembly and, in its operating position, includes a top center portion 22, which includes a long contoured top wall 24 having a forward edge faired into the cab roof as at 25 and extending upwardly and rearwardly as well as the upper portion of the rearwardly diverging side walls 26. The device 20 further includes left and right (not shown) side portions 28 which include the remainder of the side wall 26. The particular shape of the assembled aerodynamic device 20 is beyond the scope of the invention described herein.

Attached as by bolts to the inside of top wall 24 of the aerodynamic device 20 near the forward end thereof is a clevis bracket 56, to which is pivotally mounted as by pin 58 one end of forward link 60. Forward link 60 extends downwardly and rearwardly to a pivotal mounting as by pin 62 to the fore-and-aft base member 52 rearward of the front end thereof. A triangular locking plate 64 is attached in fixed position to base member 52 by pins 62 and 66 and includes in its surface an arcuate slot 68 of fixed radius about pin 62. A bolt assembly 70 passes through both slot 68 and a hole provided in the forward link 60 so that when the bolt assembly 70 is loose, movement of the link 60 is controlled by the slot and when the bolt assembly 70 is tightened, the forward link is locked to the locking plate 64 and thus its position is fixed relative to the cab roof 14. The locking plate 64 further has an additional hole 72 disposed to register in the raised position of the link with a hole in link 60 to receive bolt assembly 74 and thus provide an additional locking of link 60 in the operating position shown in FIGS. 1 and 3.

A second clevis bracket 78 is attached as by bolts to the underside of top portion 22 of aerodynamic device 20 near the rear end thereof. A rearward link 80 is attached at one end to the clevis bracket by a pin 82 and at the other end, in the operating position shown in FIG. 1, is attached by bolt assembly 84 to the rear end of base member 52. The rearward link is further provided with at least one intermediate hole 86 thereto so that the effective length of link 80 may be selectively varied by receiving bolt assembly 84 through hole 86 as shown in FIG. 2.

The side portion 28 of the aerodynamic device 20 is attached near its lower edge respectively to a front bracket 90, which in turn is mounted for selective pivotting movement to a bracket 92 attached to and extending transversely outwardly from base member 52, and to a rear bracket 94 which is mounted for selective pivotting to bracket 96 attached to the transverse stabilizer 54. The pivotal mountings of brackets 90 and 94 provide for the side portion 28 to swing inwardly about the coincident pivot axes formed in the pivotal connections of brackets 90, 92 and 94, 96. Bolt assemblies are disposed between the brackets to provide pivotting when loose and to prevent relative movement when tightened.

In the raised operating position of the deflector, the top portion 22 and side portion 28 overlap and are bolted together as by bolts 98 disposed along the overlap, thereby forming a rigid structure. To facilitate aligning the holes in the top and side portions as well as to accommodate misalignment of the pivot axes of the brackets, the brackets 92, 96 are slotted as at 100. The mating brackets may have additional holes which register with the slots 100 or with other holes provided in brackets 92, 94 for the purpose of providing secure connections of the brackets by bolt assemblies in both the raised and lowered positions of the aerodynamic device 20.

Trucks are initially shipped from the factory in the folded or collapsed position shown in FIG. 2. In this temporary position, the side portions 28 are folded inwardly toward the center of the cab roof 14 and, in this position, the brackets 90, 92 and 94, 96 are maintained in fixed relative position by tightening the bolt assemblies therethrough to prevent movement of the side portions during transport. The top portion 22 is lowered over the free ends of the side portions 28 and, with bolt assembly 84 loosely in intermediate hole 86 of rear link 80, is swung on loose forward link 60 to its lowered forward position shown in FIG. 2 wherein the forward end substantially overhangs the windshield of cab 10. Bolt assemblies 70, 74 and 84 fixing the positions of the front link 60 and rearward link 80 are then tightened and the vehicle is ready for transport.

When it is desired to raise the fairing to its operating position shown in FIG. 1, bolt assemblies 70 and 74 are loosened and the top portion 22 of device 20 is swung upwardly and rearwardly on links 60 and 80 until forward link 60 is in the upper position, as shown in FIG. 1, its movement being limited by slot 68. Bolt assembly 70 is tightened and locking bolt assembly 74 is inserted in hole 72 in locking plate 60 and tightened to fix forward link 60 in the raised position. Bolt assembly 84 in rearward link 80 is then removed and the top section 22 of the wind deflector 20 is raised to the operating position by extending link 80 until the bottom hole of link 80 can be attached by bolt assembly 84 to base member 52. The bolt assemblies on the side portion brackets 90, 92 and 94, 96 are loosened and the side portion 28 is pivotted upwardly to connect with the top portion 22 and is bolted thereto along the overlap by bolt 98. The brackets 90, 92 and 94, 96 are now firmly bolted together and a rigid long lasting wind deflector structure fixed to the roof of the cab 10 is provided.

Thus, there has been provided, in accordance with the invention, a wind deflector mounting apparatus which fully meets the objects and the advantages set forth above. Although the invention has been described in connection with a single embodiment thereof, it is intended to cover all embodiments as may fall within the scope of the appended claims.

What is claimed is:

1. Apparatus for attaching an aerodynamic device to the roof of a truck cab comprising:
 a base member attached in fixed position to said cab roof;
 a forward link having one end pivotally connected to a forward portion of said aerodynamic device and a second end pivotally connected to the forward portion of said base member;
 a rearward link having one end pivotally connected to a rearward portion of said aerodynamic device and a second end pivotally connected to a rearward portion of said base member, said forward and rearward links forming, with said aerodynamic device and said base member, a four-bar linkage disposed to provide a first lowered position with the forward edge of said aerodynamic device extending forwardly of said cab roof and said rearward portion lowered and a second raised operating position with the front edge shifted rearwardly and said rearward portion raised; and
 means for fixing said aerodynamic device in said operating position.

2. The invention in accordance with claim 1 and said rearward link having a plurality of selective locations for establishing the connection of said rearward link to said base member including an intermediate location for use when the aerodynamic device is in the lowered position and an end location when said aerodynamic device is in said raised operating position.

3. The invention in accordance with claim 1 and said means for fixing said aerodynamic device in said raised operating position comprising a locking plate fixed to said base member and means for affixing the forward link thereto.

4. The invention in accordance with claim 3 and said locking plate fixing the position of said forward link in both the raised and the lowered position thereof.

5. The invention in accordance with claim 4 and said locking plate including slot means cooperating with pin means disposed on said forward link for controlling the movement thereof between said lowered and raised positions.

6. The invention in accordance with claim 5 and said pin means comprising a selectively tightenable bolt assembly.

7. The invention in accordance with claim 1 and said aerodynamic device comprising the center portion of a three-piece aerodynamic wind deflector having side portions, said side portions being foldable beneath said center portions in the lowered position.

8. In a highway truck tractor having a cab, an aerodynamic device mounted on the roof of said cab and having a raised position for deflecting an air stream onto the roof of a trailer and a lowered position for transport of the truck tractor, and means for mounting said device on said cab roof including a base member attached to the cab roof and a selectively variable length link connected between a rearward portion of said aerodynamic device and said base member, the improvement comprising a forward link having a first end pivotally connected to the forward portion of said device and another end pivotally connected to the forward portion of the base member and disposed to cause the aerodynamic device to be shifted forwardly relative to said cab roof when said device is moved to said lowered position.

9. The invention in accordance with claim 8 and a locking plate mounted to said base member and means for securing said forward link to said locking plate when said forward link is in the raised position.

10. The invention in accordance with claim 9 and means associated with said locking plate disposed to selectively secure the position of said forward link relative to said base member in both the raised and lowered positions of said aerodynamic device and disposed to limit the motion of said link when said link is not secured to said locking plate.

11. The invention in accordance with claim 10 and said aerodynamic device comprising a top portion attached to said forward and variable length links, and side portions attached through hinge means to said base member and secured to said top portion in the raised position of said aerodynamic device, said side portions being disposed to fold inwardly beneath said lowered position.

* * * * *